Oct. 12, 1971   C. W. DEE   3,611,532
FLUID FEED SLOTS METHOD
Original Filed March 4, 1968

INVENTOR:
COLIN W. DEE

United States Patent Office 3,611,532
Patented Oct. 12, 1971

3,611,532
FLUID FEED SLOTS METHOD
Colin William Dee, 2 Frederica Road,
Bournemouth, Hampshire, England
Original application Mar. 4, 1968, Ser. No. 710,258, now Patent No. 3,510,176, dated May 5, 1970. Divided and this application Oct. 23, 1969, Ser. No. 871,138
Claims priority, application Great Britain, Mar. 6, 1967, 10,538/67
Int. Cl. B23p 11/00; B21d 53/10; F16c 17/16
U.S. Cl. 29—149.5                                    4 Claims

ABSTRACT OF THE DISCLOSURE

A fluid bearing has first and second relatively rotatable bearing members defining a body-of-rotation bearing volume between them, one of said members having therein a plurality of angularly-spaced fluid feed slots each of which opens at one of its ends into the bearing volume. A method of making such slots comprises the steps of providing in said one bearing member two elements each having an exposed face which, when the elements are assembled in said one bearing member, is butted against the exposed face of the other element, removing material by milling or grinding from at least one of said elements at its exposed face so as to form in said face a plurality of recesses separated by lands and corresponding in position to said slots, lapping said lands so as to obtain a desired depth of recess, and thereafter assembling said elements in said one bearing member with their respective exposed faces abutting so as to define said slots.

---

This application is a division from my U. S. patent application No. 710,258 dated Mar. 4, 1968, on which Letters Patent No. 3,510,176 issued on May 5, 1970.

This invention relates to a method of making and assembling hydrostatic liquid bearings, that is to say bearings of the kind in which the bearing surfaces of the two relatively movable members are kept separated by a film of lubricant liquid in the bearing volume.

A conventional construction of such bearing has small orifices for supply of pressure fluid to the bearing gap, but the production of small orifices by drilling, and particularly in bearing members of adequate thickness and rigidity, gives rise to great difficulties in practice. In specification No. 3,510,176 there is given a full discussion of these and other disadvantages of using small orifice restrictors for supply of the pressure fluid, and it is suggested to use instead, for the supply of the pressure fluid, a plurality of angularly-spaced feed slots each of which opens at one of its ends into the bearing volume.

The object of the present invention is to provide a method for obtaining such slots of a desired thickness.

According to the present invention, in a method of making a hydrostatic fluid bearing having first and second relatively rotatable bearing members defining a body-of-rotation bearing volume between them, one of said members having therein a plurality of angularly-spaced fluid feed slots each of which opens at one of its ends into the bearing volume, there are included the steps of:

(i) Providing in said one bearing member two elements each having an exposed face which, when the elements are assembled in said one bearing member, is abutted against the exposed face of the other element.

(ii) Removing material by milling or grinding from at least one of said elements at its exposed face so as to form in said face a plurality of recesses separated by lands and corresponding in position to said slots.

(iii) Lapping said lands so as to obtain a desired depth of recess, and (iv) Thereafter assembling said elements in said one bearing member with their respective exposed faces abutting so as to define said slots.

It is advantageous if the sum of the angular elongations of the slots is very much the greater part of the circumference, and a preferred value is greater than 75%, whereby dispersion losses are effectively eliminated.

The use of a plurality of such inlet slots eliminates all of the disadvantages of the orifice restrictors stated above, and the existence of lands between the slots avoids losses due to circumferential flow in the inlet.

The slots may open into a simple bearing clearance or into recesses provided in known manner in one bearing member for the formation of pads of fluid to support the other bearing member.

In a preferred construction of journal bearing, the slots are defined between axially-facing surfaces of two locked elements of one of the bearing members, and in particular between a plane radial face of a first element of the bearing member and an axially-recessed face of an abutting second element of that bearing member.

The term "axially-facing" is herein intended to include both purely radial surfaces, and surfaces including a proportion of axial component.

Advantageously the plurality of slots are symmetrically angularly disposed about the axis of rotation of the bearing. They may readily be obtained in practice for a journal bearing by milling or grinding recesses across a radial face of one element of the bearing member, say in two directions at 90° or in three directions at 60°, and thereafter lapping the remaining lands to obtain the desired thickness of slot, and then abutting a plane radial face of the other element against those lands.

Because the recesses can readily be formed to any desired length, being on an exposed surface, the element in which they are formed can be of any desired thickness and strength, and thus be relatively safe under stress, as compared with known constructions in which the thickness of the element is limited by the depth to which it is in practice possible to drill holes of very small diameter.

Where the fluid bearing is a journal bearing, the respective elements by which the slots are defined could be first and second portions of a bearing shell.

An embodiment of hydrostatic fluid bearing is hereinafter particularly described with reference to the figures of the accompanying drawing, wherein.

Figure 1:
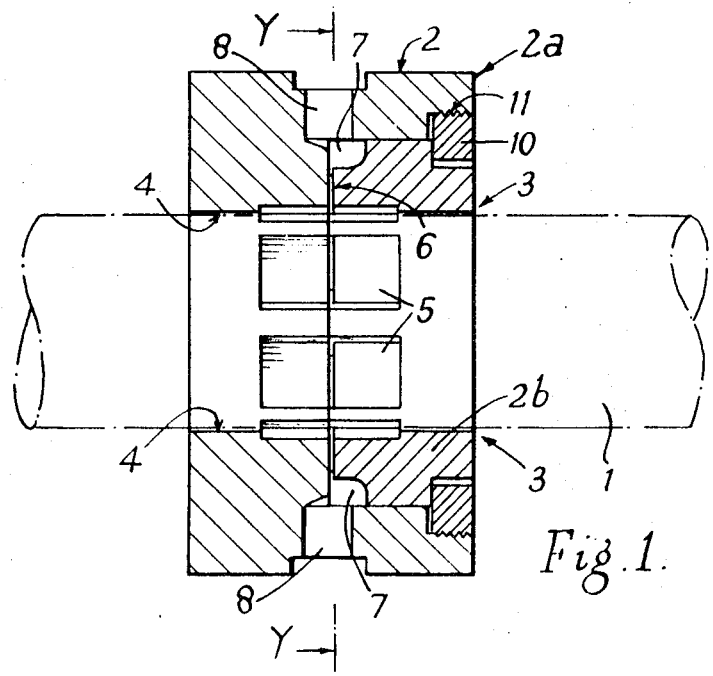
FIG. 1 is an axial section of a journal bearing, taken on the line X—X of FIG. 2.
Figure 2:
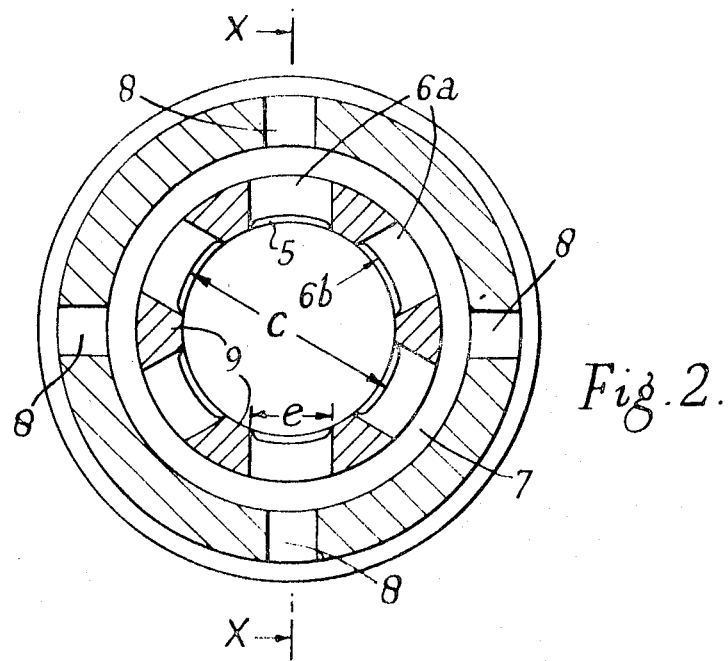
FIG. 2 is a radial section taken on the line Y—Y of FIG. 1.

In FIGS. 1 and 2 a cylindrical rotor 1 and a bearing stator 2 define between them a clearance 3. The stator 2 is composed of elements 2a and 2b, and the element 2b slides axially into a bore in the element 2a.

A bore 4 is formed partly in each of the elements 2a, 2b.

Equally in both of the elements there are formed bearing recesses 5 to which oil under pressure is fed to form fluid layers upon which the rotor shaft is supported. A metered supply of oil is fed to the recesses 5 through radial slots 6 (FIG. 1) defined between abutting end surfaces of the two elements 2a and 2b.

The oil is supplied to these slots from a common annular feed channel 7 communicating with an inlet port 8.

The slots 6 are angularly spaced and angularly elongated and are formed by making three milled recesses 6a, at 60° angular intervals, symmetrically across the radial end face of the bearing element 2b, see FIG. 2, leaving a series of lands 9 which are butted up against a plane radial end face of the other bearing element 2a.

The axial width of the slot 6a is varied by lapping the axially-exposed surface of the lands 9.

The element 2b is kept firmly butted up against the element 2a by a locking ring 10 inserted in a threaded bore in the element 2a.

The slots 6 open at their radially inner end 6b into the bearing recesses 5 and the sum of the angular elongations e of the openings of the inner ends is a major proportion of the internal circumference c of the elements 2a, 2b.

If the bearing has a simple cylindrical or conical gap, without recesses 5, the slots open at the internal periphery of the elements 2a, 2b.

The symmetrical positioning of the inlet slots ensures that the fluid enters normal to the bearing gap and so reduces to a minimum any tendency for rotational torque to be exerted. The lands between the radial recesses provide an accurately machinable base against which the other element is positioned, thereby permitting the dimensions of the slots to be extremely precisely determined, and the dimensions of the slots are not sensitive to distortion under mechanical load. The lands prevent circumferential flow in the inlet, and the fact that the openings of the slots extend over the major part of the bearing periphery effectively eliminates the dispersion losses associated with the known orifices and capillaries and applies particularly to bearings without recesses or pockets. The width of the slots may be made similar to that of the bearing volume, so that the nature of flow is the same both in the slots and in the bearing volume. The bearing is accordingly insensitive to change in fluid characteristics, and does not move away from the optimum design condition when there is a change in fluid characteristics, e.g. as a result of change of temperature. Because of the relatively large cross-sectional area of the inlet slots, and the low fluid velocity therein, the bearing can be made to operate with very high supply pressures, making possible higher load capacity and stiffness than are possible with orifice bearings. The inlet slots are a closer approach to a theoretical continuous line source, as used in pressurised bearing theory, than a line of separate orifices, and more reliance can be placed on calculated performance. Accuracy of production of the slots may be achieved using standard machine tool equipment, as distinct from the special equipment required for making orifices and capillaries. The edges of the slots may be made sharp and accurate, i.e. avoiding inadvertent increases in cross-section leading to pneumatic hammer.

The use of the slotting technique permits the making of very small bearings for which the size of conventional orifices required would be too small to manufacture, and it also allows the use of refractory materials for bearings for corrosive liquids. Moreover, the bearing may be dismantled for cleaning the slots, and the provision of a plurality of slots reduces risk of blockage of the inlet.

I claim:
1. The method of making a fluid bearing having first and second relatively rotatable bearing members defining a body-of-rotation bearing volume between them, one of said members having therein a plurality of angularly-spaced fluid feed slots each of which opens at one of its ends into the bearing volume, which method includes the steps of:
  (i) providing in said one bearing member two elements each having an exposed face which, when the elements are assembled in said one bearing member, is butted against the exposed face of the other element;
  (ii) removing material by milling or grinding from at least one of said elements at its exposed face so as to form in said face a plurality of recesses separated by lands and corresponding in position to said slots;
  (iii) lapping said lands so as to obtain a desired depth of recess, and
  (iv) thereafter assembling said elements in said one bearing member with their respective exposed faces abutting so as to define said slots.

2. The method claimed in claim 1 comprising the step of removing material from the face of said lands by lapping until a desired depth of recess is obtained.

3. The method claimed in claim 1 wherein said exposed face is a radial face and the material is removed axially.

4. The method claimed in claim 1 wherein said exposed face is a circumferential face and the material is removed radially.

References Cited
UNITED STATES PATENTS

| | | | |
|---|---|---|---|
| 1,906,715 | 5/1933 | Penick | 308—9 |
| 3,158,924 | 12/1964 | Bowhill | 29—149.5 |

THOMAS H. EAGER, Primary Examiner

U.S. Cl. X.R.

29—149.5 A; 308—9